293-135 SR

OR RE 15,545

Draftsman

Feb. 20, 1923.

Re. 15,545

A. L. McGREGOR

AUTOMOBILE BUMPER

Original Filed ~~Dec. 7~~ May 3, 1920

2 sheets-sheet 1

Inventor
Allan L. McGregor
By Shell, Brock & Wes
Atty

CANCELED
CANCELED

Feb. 20, 1923. Re. 15,545

A. L. McGREGOR

AUTOMOBILE BUMPER

Original Filed ~~Dec. 7~~ May 3, 1920 2 sheets-sheet 2

Inventor
Allan L. McGregor,
By Hill, Brock & West,
Attys.

CANCELED
CANCELED

Reissued Feb. 20, 1923. Re. 15,545

UNITED STATES PATENT OFFICE.

ALLAN L. McGREGOR, OF CHICAGO, ILLINOIS.

AUTOMOBILE BUMPER.

Original No. 1,361,599, dated December 7, 1920, Serial No. 378,385, filed May 3, 1920. Application for reissue filed October 30, 1922. Serial No. 598,031.

*To all whom it may concern:*

Be it known that I, ALLAN L. McGREGOR, a citizen of the United States, residing at Chicago, in the county of Cook and State of Illinois, have invented a new and useful Improvement in Automobile Bumpers, of which the following is a specification.

This invention relates to improvements in automobile bumpers, and more particularly to devices of the character described which are constructed, for the most part, of metal bars having a degree of resiliency in the material itself to absorb the shock of impact, without the addition of springs or other shock absorbing means, the bars of which the bumper is constructed being bent or otherwise shaped to provide dependable protective means for the purpose of which these devices are ordinarily employed.

The object of this invention is to provide a construction for a bumper having the general characteristics hereinbefore suggested, and further embodying features pertaining to the formation of the inherently resilient material, calculated to effectively absorb shocks of impact without resulting in a permanent distortion of the bumper structure. A further feature of the invention pertains to pivotal means for attaching the impact member of the bumper to the frame of the vehicle.

A bumper structure embodying the features of the invention is hereinafter fully described and illustrated in connection with the accompanying drawings, in which—

Figure 1:
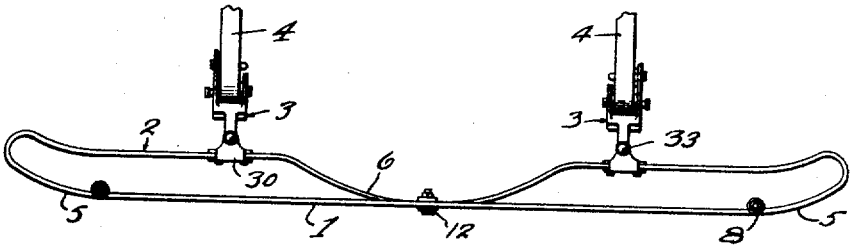
Figure 2:
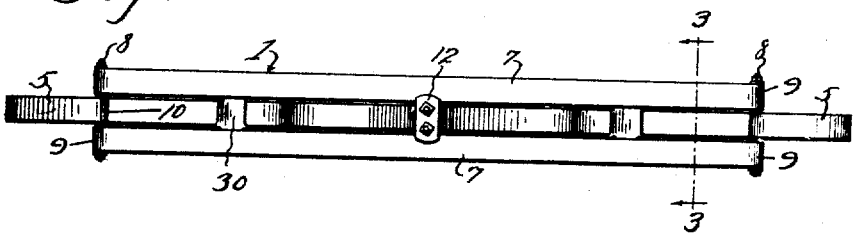
Figure 3:
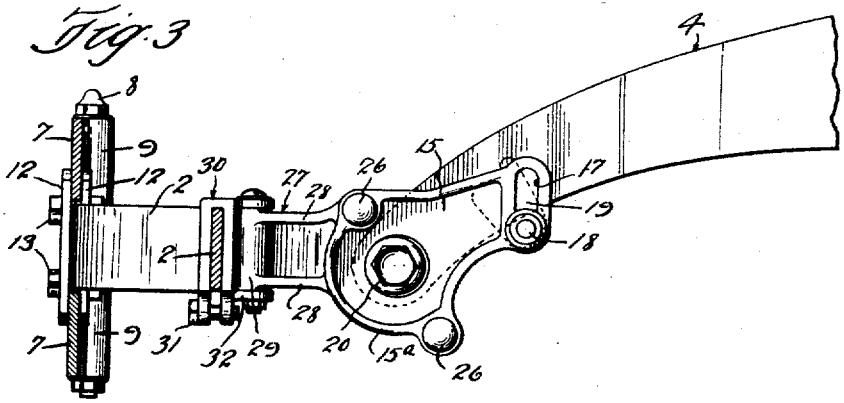
Figure 4:
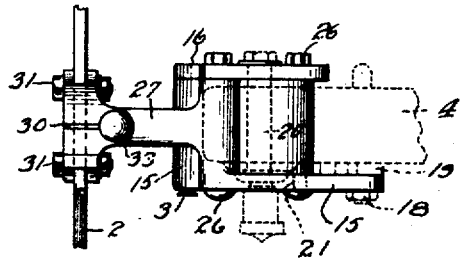
Figure 6:
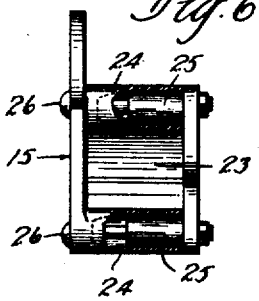
Figure 5:
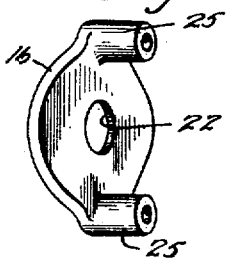
Figure 7:
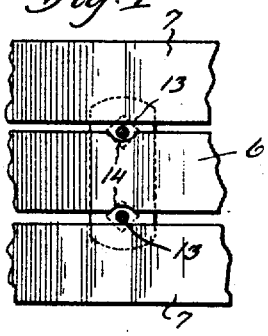

Fig. 1 is a top plan view of the bumper attached to the vehicle frame; Fig. 2 is a view in front elevation of the bumper illustrated in Fig. 1; Fig. 3 is an enlarged detailed view in vertical section as taken on line 3—3 of Fig. 2, and showing the attaching bracket in said elevation; Fig. 4 is an enlarged top plan view of the attaching bracket; Fig. 5 is a perspective view of one of the side plates of the attaching bracket; Fig. 6 is a view in rear elevation of an attaching bracket removed from the vehicle frame member, and Fig. 7 is an enlarged fragmentary view showing the manner in which the several bars of the impact member are jointed together at the central portion of the bumper.

The bumper structure herein disclosed comprises in general the impact member or bumper proper consisting of a forwardly disposed impact section 1, a rearwardly disposed secondary section comprising a resilient bar 2, and attaching brackets 3—3 attached to the longitudinal frame members 4—4 of a vehicle, and having clamping engagement with the secondary bar 2.

Referring first to the construction of the impact member, the secondary bar 2 consists of a continuous member extending throughout the length of the bumper, and having its end portions bent forwardly and inwardly in U shape, forming end sections 5—5, terminating a short distance inwardly from the extremities of the impact member. The central portion 6 of the secondary bar 2 is bent or bowed forwardly, its mid-point lying in the vertical plane of the impact section 1 and engaged thereto in a manner hereinafter to be described.

The impact section or that portion of the bumper which ordinarily receives the initial shock of impact comprises two parallel bars 7—7, preferably of resilient material, these bars being spaced apart vertically and connected together at their ends and also to the extremities of the end sections 5—5 by means of vertically arranged bolts 8—8. As a preferable means of connecting the parts together as described, the ends of the bars 7—7, as well as the end sections 5—5, are bent to form eyes 9 and 10 respectively, the ends of the end sections 5—5 being introduced between the ends of the bars 7—7, and bolts 8—8 passed through the eyes 9 and 10 positioned in registering relation. By this arrangement an impact section of increased area is formed which is pivotally connected at its ends to the single secondary bar 2, and extends throughout the central portion of the bumper, and further is uniformly distributed or arranged above and below said secondary bar 2. In addition to being pivotally connected to the ends of the secondary bar 2, the impact section 1 is further connected to said bar 2 at the central portion of the bumper, preferably by means of a pair of vertically arranged plates 12—12 which are clamped against opposite faces of the bars 7—7 of the impact section and the bowed portion 6 of the secondary bar 2, as clearly shown in Figs. 3 and 7, these plates being secured in position by means of bolts 13—13 connecting the plates together, and extending through the spaces separating the several bars. As shown in Fig. 7 the intermediate bar 6 has portions removed as at 14 to accommodate the bolts 13—13. In this manner the forward and rear portions of the bumper are connected thereby providing a more suitable and rigid structure.

Referring now more in detail to the structure of the attaching brackets, there are two required, and both being identical in construction, a description of one will suffice. Referring therefore to one of these brackets, the same consists of two side plates 15 and 16 which are adapted to be clamped against opposite sides of a frame member 4, and at the extremity thereof. One of the side plates 15 is applied to the outer lateral face of the frame member 4 and consists of a suitably shaped member having a marginal bead 15[a] and having a semi-circular conformation throughout its forward portion. The rear portion of the plate 15 is extended in the general direction of the frame member 4, and is provided with a vertical slot 17 adapted to receive a bolt 18 forming a part of a suitable clamping member 19 used for adjustably connecting the plate 15, as well as the entire attaching bracket, to the lower edge of the frame member 4 at a point rearwardly of its extremity. The principal point of connection between the plate 15 as well as of the attaching bracket, is the pivot bolt 20 which is a part of the vehicle frame, said bolt extending through a central aperture 21 formed in the plate 15, and likewise through a similar opening 22 located in a corresponding position in the plate 16 on the opposite side of the frame member 4. Integral with the plate 15 and having the same conformation as the forward portion thereof, is a laterally extending flange 23 adapted to have abutting relation with the opposite or companion plate 16, there being further formed at the extremities of the flange 23 two integral sleeves 24—24, which form in effect laterally opening sockets which receive tubular extensions 25—25 integral with the plate 16, as clearly shown in Figs. 5 and 6. Arranged in diametrically opposed relation and extending laterally through the plates 15 and 16, as well as the sleeves 24—24 and tubular extensions 25—25, respectively, thereof, are bolts 26—26, these bolts serving to clamp the plates 15 and 16 securely together, the latter thus forming a box-like structure surrounding the end of the frame member 4. Integral with the plate 15 is a forwardly projecting arm 27, having the nature of a vertical web reinforced by marginal beads 28—28, said arm terminating in a vertically disposed sleeve 29. Mounted at the end of the arm 27 is a clamping plate 30 comprising a U-shaped yoke opening downwardly and adapted to receive within the space formed by the yoke a bar 2, the latter being securely fixed in place by means of a bolt 31 extending through the lower extremities of the yoke forming portions of the clamping plate 30. Integral with the clamping plate 30 are two spaced lugs 32 adapted to engage the ends of the sleeve 29 of the arm 27, and a bolt 33 inserted through holes formed in said lugs and the said sleeve embraced by said lugs. The bolt preferably has a sufficient degree of looseness to permit rotative movement between the clamping plate and the arm 27, thus providing pivotal connection between the bumper and the attaching brackets 3—3. The attaching brackets herein described, together with the means for connecting the same with the bumper, provide a desirable supporting means for the impact member of the structure, in that it affords the necessary degree of relative movement between the parts so that they may freely yield at the instant of impact, thereby distributing the force uniformly throughout the entire structure, and after the shock has been absorbed, to return to their normal conformation. The attaching brackets are of exceedingly rugged construction, and thus are capable of withstanding the shock of impact without being fractured.

The features of construction described in connection with a preferred embodiment of the invention, may obviously be modified without departing from the spirit of the invention. Therefore, I do not wish to be limited except in so far as the invention is specificially set forth in the appended claims.

Having thus described my invention, what I claim is:—

1. An automobile bumper comprising a bar adapted for attachment to a vehicle frame and having its ends bent U-shaped and a forwardly disposed impact section comprising parallel bars connected together at their ends, and with the free ends of said first mentioned bar.

2. An automobile bumper comprising a single bar extending throughout the length of the bumper structure, and bent U-shape adjacent its ends to form forwardly disposed end sections, and an impact section comprising bars spaced apart vertically, the bars of said impact section embracing and having pivotal connection with said end sections.

3. An automobile bumper comprising a single bar extending throughout the length of the bumper structure, and bent U shape adjacent its ends to form forwardly disposed end portions, and an impact section comprising bars spaced apart vertically, the ends thereof having pivotal connection with said end portions of said first mentioned bar.

4. An automobile bumper comprising a

CANCELLED
CANCELLED

Draftsman bar extending throughout the length of the bumper structure, and bent in U shape at its ends, forming forwardly disposed end sections, an impact section comprising parallel bars spaced apart vertically and pivotally connected at their ends with said end sections, and intermediate their ends with said first mentioned bar.

5. An automobile bumper comprising a resilient bar extending lengthwise of the bumper structure, an impact bar spaced forwardly of said bar and pivotally connected at its ends with the ends of said first mentioned bar, the central portion of one of said bars being bowed into vertical alignment with the other of said bars, and clamping plates connecting said bars together intermediate the ends of said impact section.

6. An automobile bumper comprising a resilient bar extending lengthwise of the bumper structure, an impact section spaced forwardly of said bar and comprising parallel bars pivotally connected at their ends in vertically spaced relation to the ends of said first mentioned bar, the central portion of the latter being bowed outwardly and extending between the bars of said impact section, and clamping plates connecting said bars together intermediate the ends of said impact section.

7. An automobile bumper comprising a resilient bar extending throughout the length of the bumper structure, the ends of said bar being bent to form forwardly disposed end sections, and an impact section comprising parallel bars spaced apart vertically, and connected together at their ends and pivotally connected with the end sections, the central portion of said first mentioned bar being bowed outwardly into the vertical plane of said impact section and clamped thereto, and brackets adapted to be attached to the frame members of a vehicle and comprising clamping plates engaging said resilient bar.

8. An automobile bumper comprising a bar extending throughout the length of the bumper structure, the ends of said bar being bent to form forwardly disposed end sections, and an impact section comprising parallel bars spaced apart vertically, and connected together at their ends and with the end sections by bolts extending through eyes formed at the ends of the bars, the central portion of said first mentioned bar being bowed outwardly and extending between the bars of said impact section, and means connecting said bars together.

9. An automobile bumper comprising a rearwardly disposed resilient bar and a forwardly disposed impact section extending between and pivotally connected to the ends of said bar, and an attaching bracket comprising a plate fixed to a vehicle frame member and having a forwardly extending arm, and a clamping member engaging said resilient bar and pivotally mounted at the end of said arm.

10. An automobile bumper comprising an impact member formed of a rearwardly disposed resilient bar bent forwardly in U shape at its ends, and an impact section extending between and pivotally connected to the ends of said bar, and a bracket for attaching said impact member to the frame members of a vehicle comprising a plate fixed to the frame member, and provided with a forwardly extending arm and a clamping member engaging said bar and pivotally mounted at the end of said arm.

11. An automobile bumper comprising an impact section consisting of a plurality of bars adapted to extend transversely with respect to the vehicle, and a secondary bar having its ends pivotally connected to the ends of the impact section and its central portion projected between the central portions of the impact bars and connected thereto.

12. An automobile bumper comprising an impact section consisting of a plurality of bars adapted to extend transversely with respect to the vehicle, and a secondary bar having its ends pivotally connected to the ends of the impact section and its central portion projected toward and connected to the central portions of the impact bars.

13. An automobile bumper comprising a secondary bar extending lengthwise of the bumper and an impact section comprising a plurality of vertically spaced bars also extending lengthwise of the bumper structure and connected at their ends to the ends of the first mentioned bar, and means connecting the central portion of said impact section and said secondary bar.

14. An automobile bumper comprising a bar extending lengthwise of the bumper structure and an impact section comprising vertically spaced bars connected together at their ends and with the ends of the first mentioned bar by means of bolts extending through eyes formed at the ends of the bars, the central portion of the first mentioned bar being projected toward and connected to the said impact section.

15. An automobile bumper comprising an impact section and a secondary section, one of said sections comprising vertically spaced bars, the sections being connected together by means of bolts extending through eyes formed at the ends thereof, the intermediate portion of the secondary section being projected toward and connected to the impact section.

16. An automobile bumper comprising a pair of vertically spaced bars extending lengthwise of the bumper structure and constituting an impact section, the ends of said bars being provided with eyes, and a secondary bar having its ends provided with eyes located between the eyes at the corresponding ends of the first mentioned bars, and bolts extending through the eyes at each end of the bumper structure, the central portions of said bars being connected together.

17. An automobile bumper comprising an impact section and a secondary section, one of said sections comprising a pair of vertically spaced bars extending lengthwise of the bumper structure and the other section comprising a bar, the ends of said bars being pivotally connected and the intermediate portions of said bars being connected together.

18. An automobile bumper comprising a secondary bar extending lengthwise of the bumper structure and an impact section comprising bars spaced apart vertically, the ends of the bars of said impact section embracing and being pivotally connected to the ends of the secondary bar.

19. An automobile bumper comprising a pair of vertically spaced bars extending lengthwise of the bumper structure and constituting an impact section, the ends of said bars being provided with eyes, and a secondary bar having eyes at its ends adapted to be positioned between the eyes at the corresponding ends of the first mentioned bars and having its central portion projecting toward and secured to the central portions of the first mentioned bars, and bolts extending through the eyes at each end of the bumper structure.

20. An automobile bumper comprising a secondary bar extending lengthwise of the bumper structure and an impact section comprising bars spaced apart vertically, the ends of the bars of said impact section embracing and being pivotally connected to the ends of the secondary bar, and means connected with the secondary bar for pivotally supporting the bumper from a vehicle.

21. An automobile bumper comprising a secondary bar extending lengthwise of the bumper structure and an impact section comprising bars spaced apart vertically and having their ends pivotally connected to the ends of the first mentioned bar, supporting members adjustably mounted upon the secondary bar, and means for pivotally supporting each of said members from a vehicle frame member.

22. An automobile bumper comprising a secondary section extending lengthwise of the bumper structure and an impact section having its ends pivoted directly to the ends of the second section, supporting members adjustably mounted upon one of said sections, and means for pivotally supporting each of said members from a vehicle frame member.

23. The combination, with a vehicle frame member, of a bumper supporting arm connected thereto, a bumper comprising a secondary section and an impact section comprising a pair of vertically spaced bars pivotally connected at their ends to the ends of the secondary section, and means adjustably mounted upon one of said sections for pivotally connecting the same to the said arm.

24. A bumper comprising a secondary bar and a plurality of vertically spaced impact bars pivotally connected at their ends to the ends of the secondary bar, the central portion of the secondary bar being projected toward and connected to the central portions of the impact bars, and means including a pair of vertical pivots for adjustably connecting the secondary bar to a vehicle frame.

25. An automobile bumper comprising an impact section having a pair of vertically spaced bars and a secondary section having its ends pivotally connected to the ends of the first mentioned bars, supporting arms for attaching the bumper to the vehicle frame, and a pivotal connection between each of said arms and the secondary section of the bumper.

26. An automobile bumper comprising a secondary bar extending lengthwise of the bumper structure and an impact section comprising bars spaced apart vertically, said bars being provided with eyes at their ends, and means extending through the eyes at each end of the bumper structure for connecting the impact bars and the secondary bars.

27. An automobile bumper comprising a secondary bar extending lengthwise of the bumper structure and having eyes at the ends thereof and an impact section comprising a pair of bars spaced apart vertically and each having eyes at its ends, the eyes at the ends of the secondary bar being positioned between the eyes on the corresponding ends of the bars of the impact section, and bolts extending through and pivotally connecting the eyes at each end of the bumper structure.

28. An automobile bumper comprising a pair of vertically spaced impact bars, each having an eye at an end thereof, a bar having an eye at an end thereof interposed between the eyes on said impact bars and having a portion connected to said impact bars at points spaced from said eyes, and a bolt extending through and connecting the said eyes.

29. An automobile bumper comprising an impact section having a pair of vertically spaced bars, each having an eye at an end thereof, a bar having an eye at an end thereof interposed between the eyes on the impact bars, the last mentioned bar being connected to said impact section at a distance from said eyes, a bumper-supporting member connected with the third-mentioned bar, and a

CANCELED
CANCELED bolt extending through and connecting the said eyes.

30. An automobile bumper comprising an impact section having a pair of vertically spaced bars, each having an eye at an end thereof, a bar having an eye at an end thereof interposed between the eyes on said impact bars and having a portion connected to said impact section at a distance from said eyes, a bumper-supporting clamp adjustably mounted on a portion of the third-mentioned bar which is intermediate of the eye and the connected portion of said third mentioned bar, and a bolt extending through and connecting said eyes.

31. An automobile bumper comprising an impact section having a pair of vertically spaced bars, a secondary section connected at one end to corresponding ends of the impact bars, and a bumper-supporting member mounted on said secondary section.

32. An automobile bumper comprising an impact section having a pair of vertically spaced bars, a secondary section connected to the body portions of said bars and having an end connected to and between corresponding ends of said bars, and bumper-supporting members adjustably mounted on said secondary section.

33. An automobile bumper comprising an impact section having a pair of vertically spaced bars provided with eyes at their ends, a secondary section having eyes interposed between the eyes on the impact bars, and bolts extending through said eyes.

34. A bumper comprising an impact section having a pair of vertically spaced bars, and a secondary bar connected at its ends to said impact section.

35. A bumper comprising an impact section having a pair of vertically spaced bars, and a secondary bar connected at its ends to the ends of the impact section and having an intermediate portion connected to an intermediate portion of the impact section.

In testimony whereof I hereunto affix my signature.

ALLAN L. McGREGOR.